United States Patent
Fork et al.

(10) Patent No.: US 8,983,197 B2
(45) Date of Patent: *Mar. 17, 2015

(54) OBJECT TAG METADATA AND IMAGE SEARCH

(71) Applicant: International Business Machines Corporation, Armonk, NY (US)

(72) Inventors: Michael J. Fork, Gibsonburg, OH (US); Rick A. Hamilton, II, Charlottesville, VA (US); Kevin G. Paterson, San Antonio, TX (US); James R. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,367

(22) Filed: Mar. 8, 2013

(65) Prior Publication Data

US 2013/0204866 A1 Aug. 8, 2013

Related U.S. Application Data

(63) Continuation of application No. 13/368,775, filed on Feb. 8, 2012.

(51) Int. Cl.
 *G06K 9/00* (2006.01)
 *G06F 17/30* (2006.01)

(52) U.S. Cl.
 CPC .... *G06F 17/30277* (2013.01); *G06F 17/30268* (2013.01)
 USPC .......................................................... 382/190

(58) Field of Classification Search
 None
 See application file for complete search history.

(56) References Cited

U.S. PATENT DOCUMENTS

| 5,381,526 | A | 1/1995 | Ellson | |
|---|---|---|---|---|
| 7,686,682 | B2 | 3/2010 | Diakopoulos et al. | |
| 7,716,157 | B1* | 5/2010 | Bourdev et al. | 1/1 |
| 7,788,267 | B2 | 8/2010 | Wolas-Shiva et al. | |
| 7,844,591 | B1* | 11/2010 | Lettau et al. | 707/706 |
| 7,916,976 | B1* | 3/2011 | Kedikian | 382/305 |
| 8,081,198 | B1* | 12/2011 | Ayers et al. | 345/629 |
| 8,532,377 | B2* | 9/2013 | Skaff et al. | 382/165 |

(Continued)

FOREIGN PATENT DOCUMENTS

WO 2010085186 A1 7/2010

OTHER PUBLICATIONS

Bo Luo, Xiaogang Wang, and Xiaoou Tang; "A world Wide WEb Based Image Search Engine Using Text and Image Content Features"; 2003; Electronic Imaging, SPIE vol. 5018.*

(Continued)

*Primary Examiner* — Jon Chang
*Assistant Examiner* — Oneal R Mistry
(74) *Attorney, Agent, or Firm* — Patterson & Sheridan, LLP

(57) ABSTRACT

Techniques are disclosed for ordering images. The technique includes receiving a request, the request including keywords and parameters specifying desired image characteristics. Further, the technique includes identifying a set of images responsive to the request based on a match of the keywords to tags associated with objects depicted in the set of images. Finally, the technique includes determining an ordering of the identified set of images by comparing the received parameters with metadata fields associated with respective tags of the objects and returning an indication of the set of images and the determined ordering of the images.

8 Claims, 7 Drawing Sheets

(56) References Cited

U.S. PATENT DOCUMENTS

| | | | |
|---|---|---|---|
| 2004/0190793 A1* | 9/2004 | Rorvig et al. | 382/305 |
| 2007/0076960 A1* | 4/2007 | Takamori et al. | 382/224 |
| 2008/0069480 A1 | 3/2008 | Aarabi et al. | |
| 2010/0030766 A1 | 2/2010 | Li et al. | |
| 2010/0135597 A1* | 6/2010 | Gokturk et al. | 382/305 |
| 2011/0026853 A1 | 2/2011 | Gokturk et al. | |
| 2011/0034176 A1 | 2/2011 | Lord et al. | |
| 2013/0044944 A1* | 2/2013 | Wang et al. | 382/165 |

OTHER PUBLICATIONS

John Smith, Shih-Fu Chang; "Multi-stage Classification of Imagesfrom Features and Related Text"; IBM, IEEE.*

Xin-Jing Wang, Lei Zhang, Feng Jing, Wei-Ying Ma; "Anno Search: Image Auto-Annotation by Search"; 2005.*

Mengleie Jia, Xin Fan, Xing Xie, Mingjing Li, Wei-Ying Ma; "Photo-to-Search: Using Camera Phones to Inquire of the Surrounding World"; 2006, IEEE, Computer Society.*

Frigui, Hichem et al., Image Database Categorization under Spatial Constraints using Adaptive Constrained Clustering, IEEE International Conference on Fuzzy Systems, Jun. 2008, pp. 2268-2276, IEEE, Piscataway, New Jersey, United States.

Caicedo, Juan C., Multimodal Information Spaces for Content-based Image Retrieval, National University of Colombia: Doctoral program on Systems and Computer Engineering Engineering School, Jun. 2009, National University of Colombia, Bogota, Colombia.

Mayron, Liam M., Image Retrieval Using Visual Attention: A Dissertation Submitted to the Faculty of The College of Engineering and Computer Science in Partial Fulfillment of the Requirements for the Degree of Doctor of Philosophy, May 2008, pp. i-82, Florida Atlantic University, Boca Raton, Florida, United States.

Veltkamp, Remco C., et al., Content-Based Image Retrieval Systems: A Survey, Department of Computing Science, Utrecht University, Oct. 2000, Utrecht University, Utrecht, Netherlands.

Guan, Haiying et al., Bridging the Semantic Gap Using Ranking SVM for Image Retrieval, Proceedings of the Sixth IEEE international conference on Symposium on Biomedical Imaging: From Nano to Macro, Jun. 2009, pp. 354-357, IEEE Press, Piscataway, New Jersey, United states.

Tomko, Martin et al., Identification of Practically Visible Spatial Objects in Natural Environments, Advances in GIScience: Proceedings of the 12th AGILE conference, Jun. 2009, Springer, New York, New York, United States.

Berg, Tamara L. et al., Finding Iconic Images, IEEE Computer Society Conference on Computer Vision and Pattern Recognition Workshops, Jun. 2009, pp. 1-8, IEEE Computer Society, Piscataway, New Jersey, United States.

Cai-Dong, Gu et al., Image Knowledge Management and Rapid Precise Image-Mining Technology Investigation in Internal Cloud Computing, The 1st International Conference on Information Science and Engineering, Dec. 2009, pp. 2940-2942, The Institute of Electrical and Electronics Engineers, Inc. Danvers, MA, United States.

Berg, Tamara L. et al., Automatic Ranking of Iconic Images, Technical Report, Jan. 12, 2007, University of California, Berkeley, Berkeley, CA, United States.

U.S. Appl. No. 13/368,775, entitled Object Tag Metadata and Image Search, filed Feb. 8, 2012.

Mayron, Liam M., Image Retrieval Using Visual Attention: A Dissertation Submitted to the Faculty of The College of Engineering and Computer Science in Partial Fulfillment of the Requirements for the Degree of Doctor of Philosophy, May 2008, pp. 83-182, Florida Atlantic University, Boca Raton, Florida, United States.

Mayron, Liam M., Image Retrieval Using Visual Attention: A Dissertation Submitted to the Faculty of The College of Engineering and Computer Science in Partial Fulfillment of the Requirements for the Degree of Doctor of Philosophy, May 2008, pp. 183-217, Florida Atlantic University, Boca Raton, Florida, United States.

Chen, Yuxin et al., iLike: Integrating Visual and Textual Features for Vertical Search, Proceedings of the international conference on Multimedia, 2010, ACM, New York, United States.

* cited by examiner

620
D = 0.96

630
D = 1.00

640
D = 1.60

610
D = 1.06 though, by the term "aspect" is not limiting of the scope of the invention.

OBJECT TAG METADATA AND IMAGE SEARCH

CROSS-REFERENCE TO RELATED APPLICATIONS

This application is a continuation of co-pending U.S. patent application Ser. No. 13/368,775, filed Feb. 8, 2012. The aforementioned related patent application is herein incorporated by reference in its entirety.

BACKGROUND

Embodiments presented in this disclosure generally relate to object tags and image searching. More specifically, embodiments pertain to techniques for generating image tag metadata to associate with object tags and to techniques for ordering images using the tag metadata.

Digital images have rapidly become a popular approach for capturing, storing, managing, and sharing images. In order to find particular images within a set of digital images, a user may run an "image search." Such image searches typically operate based on tags associated with the images being searched. For example, tags may be used to indicate objects (e.g., people) displayed in the images, and a search for particular objects may return a subset of images that have the searched-for objects "tagged" in the images.

Tag-based image searching does not account for the actual appearance of tagged objects within their respective images. For example, such searching does not distinguish between images in which objects appear larger and in focus from images in which those objects appear smaller and out of focus.

SUMMARY

Embodiments provide techniques for searching a set of images. In one embodiment, the technique includes receiving a request, which includes one or more keywords and one or more parameters specifying desired image characteristics. Further, the technique includes identifying a set of images responsive to the request based on a match of the keywords to tags associated with objects depicted in the set of images. Finally, the technique includes determining an ordering of the identified set of images by comparing the received parameters with metadata fields associated with respective tags of the objects and returning an indication of the set of images and the determined ordering of the images.

Additional embodiments include a computer-readable storage medium storing an application, which, when executed on a processor, performs the above recited method as well as a system having a processor and a memory storing an application configured to order images, which, when executed on the processor, performs the above recited technique.

BRIEF DESCRIPTION OF THE SEVERAL VIEWS OF DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
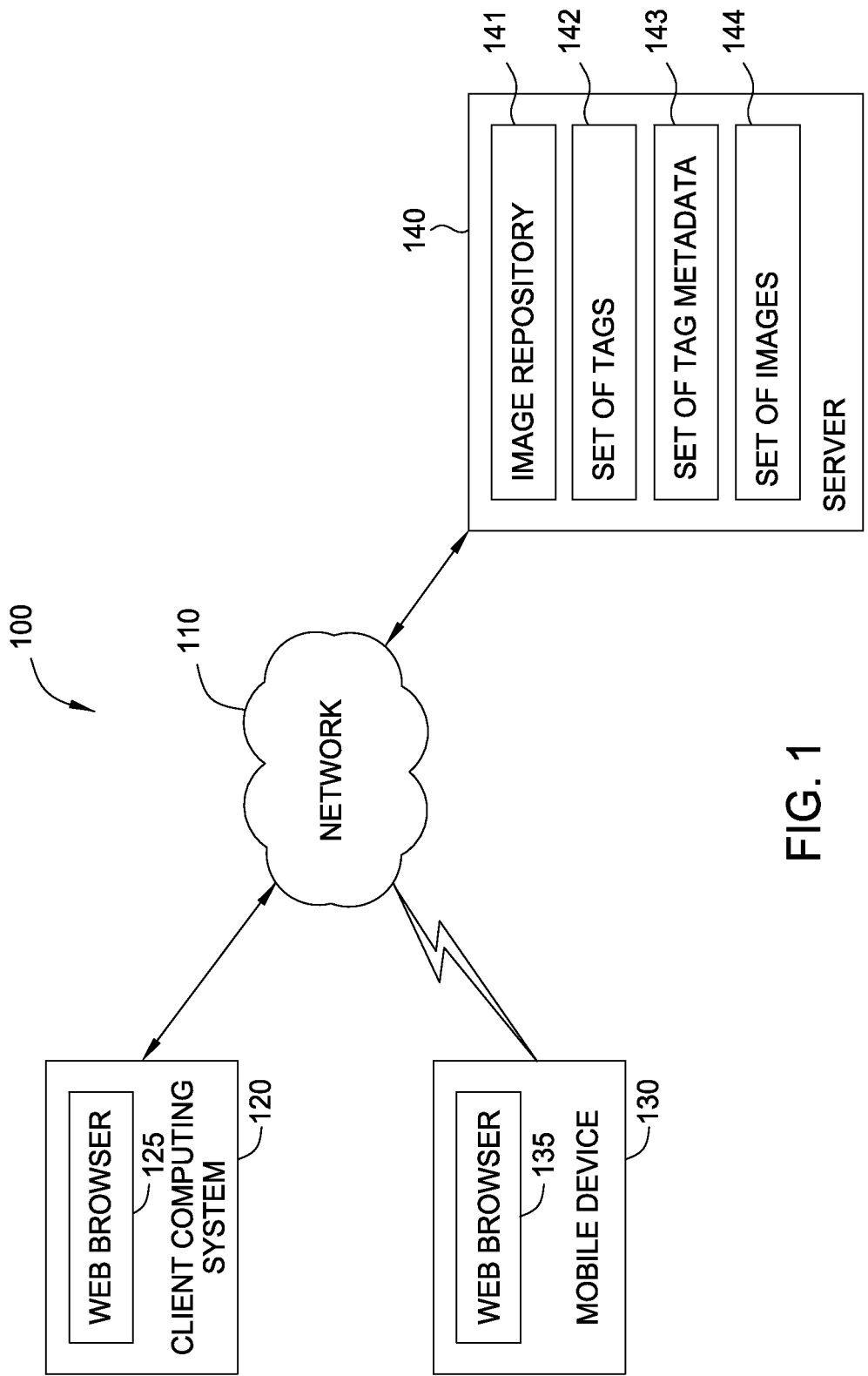
FIG. 1 illustrates an example computing infrastructure used to generate tag metadata associated with object tags and to provide image searching using the tag metadata to a variety of client systems and mobile devices, according to one embodiment of the invention.

Embodiments of the invention provide an approach for generating tag metadata associated with object tags and for searching images using the tag metadata. As noted above, image searches based on object tags alone do not account for the actual appearance of tagged objects within images. Embodiments of the invention address this drawback (among others) by making use of tag metadata indicating one or more image characteristics of associated tagged objects as they appear as part of an image. For example, consider an image depicting the Eiffel Tower. A computer may store this image and associate an "Eiffel Tower" object tag with this image. Further, tag metadata associated with the "Eiffel Tower" object tag may indicate how prominently the Eiffel Tower appears in the foreground of the image, whether it is occluded by other objects, and a measure of how well it is focused in the image. In one embodiment, a user may specify image characteristics as part of searching for tagged images. For example, in addition to searching for an image of the Eiffel Tower using the keywords "Eiffel Tower" as search terms, the user may specify, via one or more parameters, image characteristics of the Eiffel Tower object such as focus, occlusion, etc. In such a case, a search engine may identify a set of images responsive to the request based on a match of the keywords "Eiffel Tower" to object tags (e.g., an "Eiffel Tower" tag) of the image. The search engine may further determine an ordering of the identified set of images by comparing the specified image characteristic parameters with metadata fields associated with respective tags of the images. Finally, the search engine may return an indication of the set of images and the determined ordering of the images.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, some particular embodiments described below rely on an example of a system using a client-server architecture to provide image search results to a client, with digital images being photographic images. However, the techniques described herein may be adapted to a variety of systems used to search and generate tag metadata for a variety of static and dynamic digital images (e.g., animated GIF files), as well as video sequences. For example, the techniques described herein may use tag metadata to search for and order images within a local storage device on a computer system. Accordingly, references to specific embodiments below are included to be illustrative and not limiting.

FIG. 1 illustrates an example computing infrastructure 100 used to provide image searching functionality to a variety of client systems, according to one embodiment of the invention. As shown, the computing infrastructure 100 includes a server 140, a client computing system 120, and a mobile device 130, each connected to a communications network 110.

Illustratively, the client system 120 and mobile device 130 include web browsers 125 and 135. Web browsers 125 and 135 provide software applications used to communicate with the server 140 over the network 110 to search images. In one embodiment, browsers 125 and 135 may be configured to query for images having particular objects (represented by image tags) and object properties (represented by tag metadata characterizing a given tag). For example, a user may interact with web browsers 125 and 135 to query for images having an Eiffel Tower object (e.g., by entering "Eiffel Tower" or "Eiffel" as a keyword) that is large in size relative to other objects within the same image. In response, a search engine and related software applications running on the server 140 may identify a set of images that depict the Eiffel Tower (or that at least include the image tag "Eiffel Tower," "Eiffel," etc.). Further, the search engine may be configured to rank or order the images based on the tag metadata. In this particular example, images that depict the Eiffel Tower more prominently than other images may rank higher in the search results than others. The resulting images (or thumbnail depictions of such images) may be returned to the client system 120 or mobile device 130 and rendered on web browser 125, 135. In addition to performing image searches and returning search results, the server 140 may also generate and store tag metadata.

As shown, the server 140 includes a set of images 144, image repository 141, a set of tags 142, and a set of tag metadata 143. The set of images 144 include user-searchable images and should be distinguished from the image repository 141, which refers herein to images used to generate tag metadata. As discussed more fully below, each image of the set of images 144 may be associated with object tags from the set of tags 142 and metadata from the set of tag metadata 143.

The image repository 141 includes one or more images with which an image may be compared. For example, the server 140 may generate metadata values by consulting the image repository 141 and assigning values to metadata fields based on comparisons of the set of images 144 to images of the image repository 141 that have the same objects. That is, values of the metadata fields for the set of images 144 may be relative, as opposed to absolute, values that are determined based on comparisons of images in the set of images 144 to images in the image repository 141.

The set of tags 142 includes image tags, also referred to herein as "object tags," that correspond to objects depicted in respective images of the set of images 144. Such object tags may be generated by an automated process or entered manually by a user.

The set of tag metadata 143 includes metadata associated with the object tags of the set of tags 142. Such metadata represents image characteristics of objects associated with the object tags as those objects appear in their respective images. Examples of specific tag metadata fields, discussed more fully below, include metadata fields representing size, contrast, isolation, occlusion, depth, fill-light, coloration, and pixelation.

Figure 2:
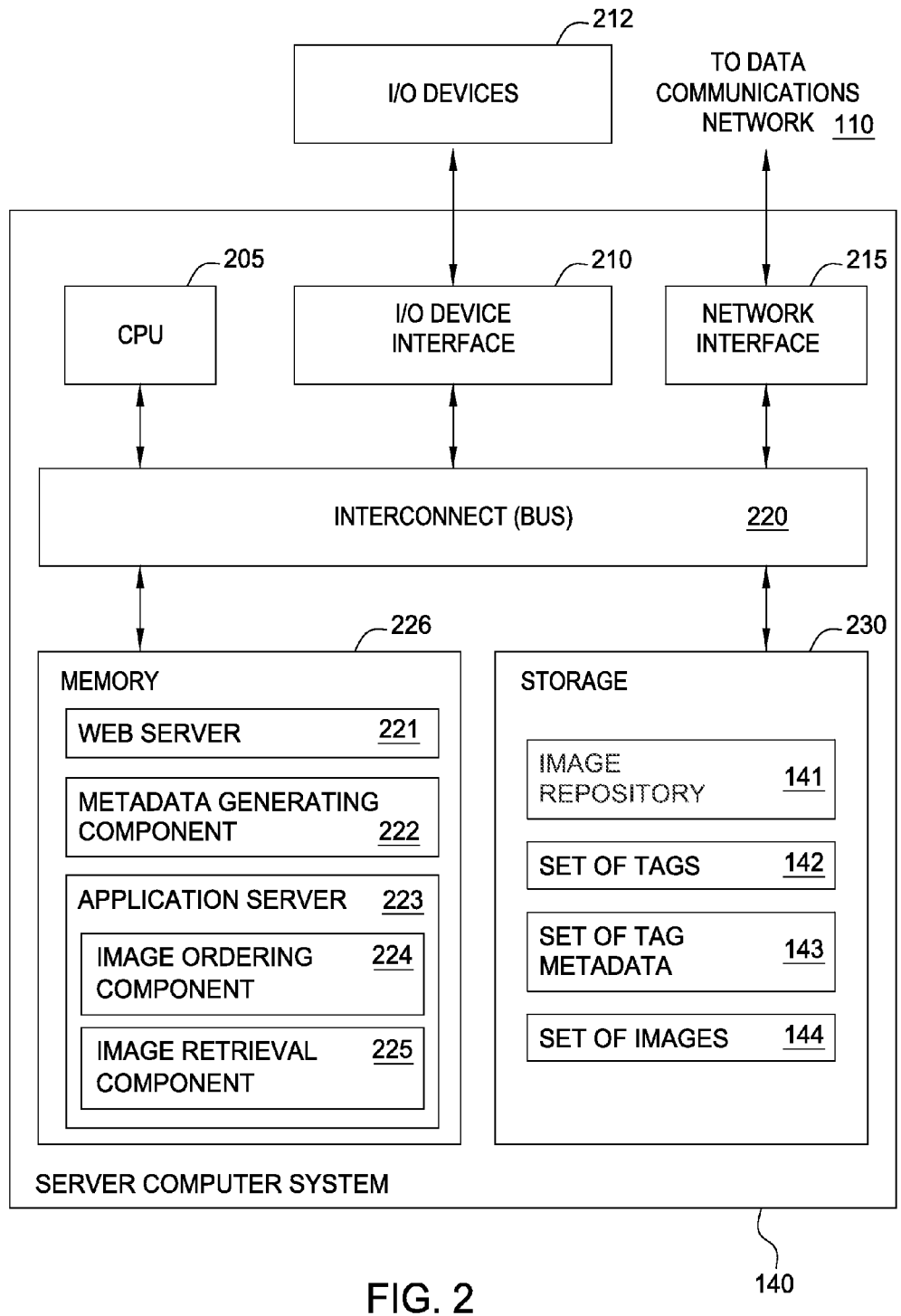
FIG. 2 illustrates an example server for generating tag metadata associated with object tags and for providing image search results, according to one embodiment of the invention.

FIG. 2 illustrates an example server for generating tag metadata associated with object tags and for providing image search results, according to one embodiment of the invention. As shown, the server 140 includes, without limitation, a central processing unit (CPU) 205, a network interface 215, an interconnect 220, a memory 226, and storage 230. The server 140 may also include an I/O device interface 210 connecting I/O devices 212 (e.g., keyboard, display and mouse devices) to the server 140.

The CPU 205 retrieves and executes programming instructions stored in the memory 226. Similarly, the CPU 205 stores and retrieves application data residing in the memory 226. The interconnect 220 facilitates transmission, such as of programming instructions and application data, between the CPU 205, I/O devices interface 210, storage 230, network interface 215, and memory 226. CPU 205 is included to be representative of a single CPU, multiple CPUs, a single CPU having multiple processing cores, and the like. And the memory 226 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards or optical storage, network attached storage (NAS), or a storage area-network (SAN).

As shown, the memory 226 includes a web server 221, an application server 223, and a metadata generating component 222. And the storage 230 includes the image repository 141, the set of tags 142, the set of tag metadata 143, and the set of images 144. Web server 221 provides a software application configured to respond to web page requests received from client computing systems (e.g., client system 120 and mobile device 130 of FIG. 1). The web server 221 may pass such a request to the application server 223, which generates content for the web server 221 to return to the client system 120 or the mobile device 130. For example, in the present context, a user may access a web page which allows the user to compose an image search query, i.e., to include keywords specifying objects and desired image characteristics for those objects. In response, the application server 223 may identify a set of images from the set of images 144 which have image tags that match the query keywords. Further, the application server 223 may determine an ordering or ranking for the identified set of images based on the desired image characteristics specified by the user.

Illustratively, the application server 223 includes an image retrieval component 225 and an image ordering component 224. The image retrieval component 225 may be configured to identify a subset of images of the set of images 144 stored in storage 230 based on one or more query parameters received from the user. Continuing the example above in which a query is received for images having an Eiffel Tower object with a large relative size, the image retrieval component 225 may identify, from the set of images 144, a subset of images having one or more of the following object tags: "Eiffel Tower," "Eiffel," "Tower," etc.

After the image retrieval component 225 identifies the subset of images, the image ordering component 224 may order the subset of images based on one or more query parameters received from the user. For example, the image ordering component 224 may order the subset of images based on at least the sizes of the objects tagged as "Eiffel Tower," "Eiffel," "Tower," etc. as compared to the sizes of other objects in their respect images. Further, the image ordering component 224 may perform the foregoing ordering based on the values of metadata fields associated with their respective "Eiffel Tower," "Eiffel," "Tower," etc. tags.

After identifying and ordering a set of images, the application server 223 returns the set of ordered images to the Web server 221, which returns an indication (e.g., thumbnails or full-sized images) of one or more images from the set of images and an ordering of those images to the client computing system 120 or the mobile device 130.

The metadata generating component 222 is configured to determine values for metadata fields associated with their respective tags 142 as a set of tag metadata 143. The metadata generating component 222 may encode the set of tag metadata 143 in any feasible format or formats. Further, the metadata generating component 222 may analyze images using any algorithm or algorithms feasible for determining one or more image characteristics of tagged objects as they appear in their respective images.

In some embodiments, the metadata generating component 222 may determine values by comparing one or more objects of an image to one or more objects of images in the image repository 141. That is, rather than determining values based solely on the appearance of the respective tagged object or objects within the image itself, the metadata generating component 122 may determine values based on a comparison of the appearance of the tagged object or objects within the image with the appearance of object or objects (e.g., objects with the same or similar tags, etc.) within images of the image repository 141.

Figure 3:
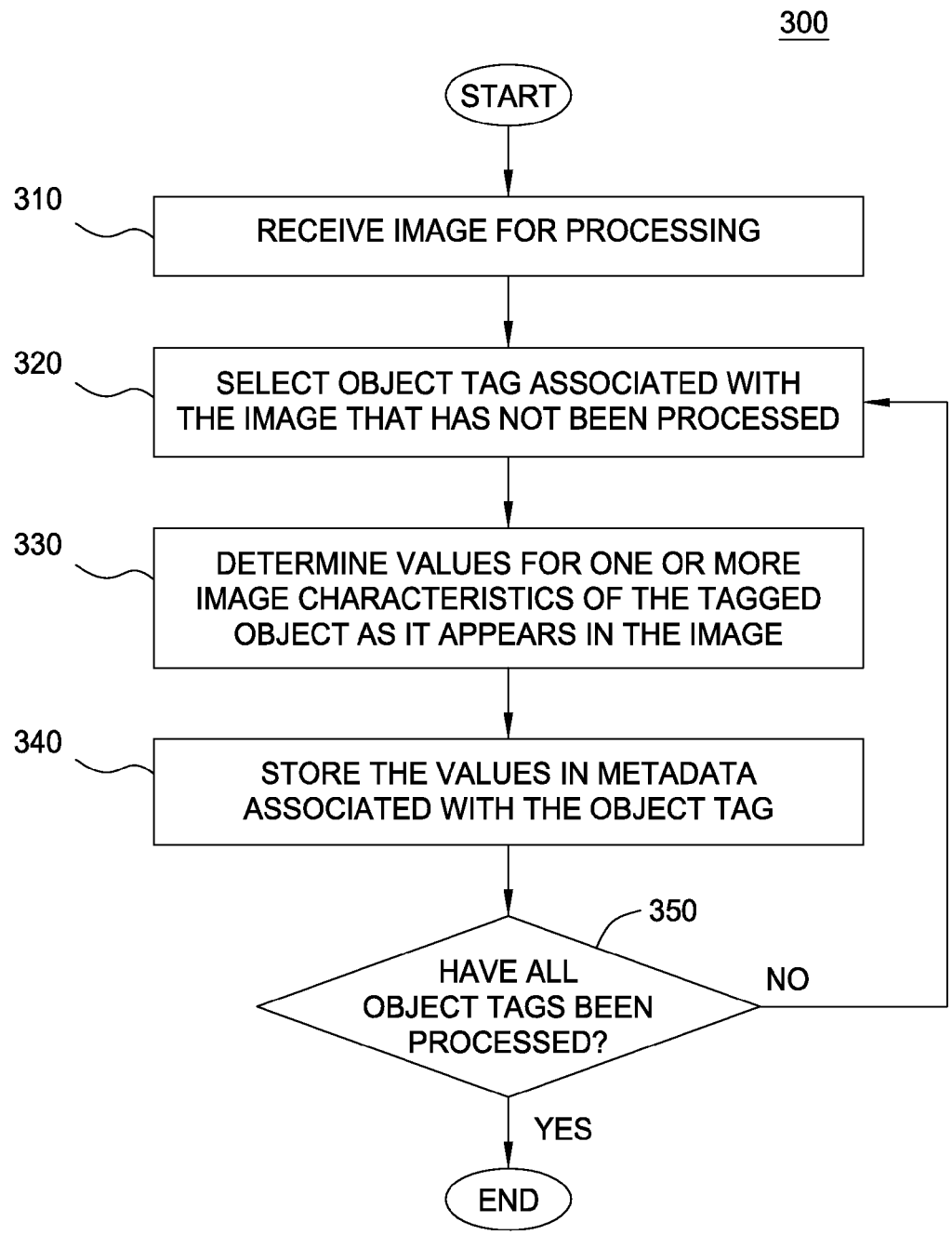
FIG. 3 illustrates a method for generating tag metadata associated with object tags, according to one embodiment of the invention.

FIG. 3 illustrates a method 300 for generating tag metadata associated with object tags, according to one embodiment of the invention. Although the method steps are described in conjunction with FIGS. 1-2, persons skilled in the art will understand that any system configured to perform the method steps, in any order, falls within the scope of the present invention.

As shown, the method 300 begins at step 310, where the metadata generating component 222 receives an image for processing. For example, before adding a new image to the set of images 144, the metadata generating component 222 may process new images to generate tag metadata. At step 320, the metadata generating component 222 selects an object tag stored in the set of tags 142 that is associated with the image received at step 310.

At step 330, the metadata generating component 222 determines values for one or more image characteristics of the tagged object as it appears in the image. The metadata generating component 222 may use any algorithm to make such determinations. For example, the size of an object as it appears in an image may be determined by counting the number of pixels used to represent the object. Likewise, a relative size of the object may be determined by comparing the number of pixels used to represent the object with the number of pixels used to represent other objects and/or the total number of pixels in the image.

Aside from size and relative size, the metadata generating component 222 may determine values for other object image characteristics. For example, the metadata generating component 222 may determine a value for how well focused the object is within the image (i.e., how crisply the object is displayed within the image). Objects with sharp delineation of features may be given higher focus values to reflect that the objects are well focused, and vice versa.

As another example, the metadata generating component 222 may determine a value for a "contrast" of the object within the image. The contrast value may reflect the level of contrast within the object itself. Alternatively, the contrast value may reflect a level of contrast between the object and its surroundings or surrounding objects, as depicted in a given image.

Still another example includes the metadata generating component 222 determining a value representing a measure of object isolation within the image. The isolation value may reflect the level of visibility of the object within the image. That is, the isolation value may reflect the degree to which the object is obstructed or occluded by other objects within the image.

Other examples of tag metadata include determining a value for depth, fill-light, coloration, or pixelation.

In some embodiments, the values determined by the metadata generating component 222 may be relative values. That is, the size, focus, contrast, etc. values of the object may be determined relative to the size, focus, contrast, etc. values of the surroundings of the object or surrounding objects. For example, in an image with high overall contrast, a particular object may have even higher contrast than surrounding objects. In such a case, the average contrast of all objects may provide a baseline (e.g., a contrast value of "0") from which the contrast value of the higher contrast object is determined.

Further, in some embodiments, the metadata generating component 222 may determine tag metadata values, at least in part, by comparing one or more objects of the image to one or more objects of images in the image repository 141. That is, rather than determining tag metadata values based on the appearance of the respective tagged object or objects within the image itself, the metadata generating component 122 may determine tag metadata values based on a comparison of the appearance of the tagged object or objects within the image with the appearance of objects (e.g., objects with the same or similar tags, etc.) within images of the image repository 141. In one embodiment, the image repository 141 may include a sample of the images in the images 144, and, in determining a tag metadata value, the metadata generating component 222 may account for the frequency with which the tagged object has a similar appearance in images of the image repository 141. For example, if an Eiffel Tower object in an image has a large size relative to other objects in the image, but many images within the image repository contain Eiffel Tower objects with similarly large relative sizes, the value of the "relative size" tag metadata for the image may be reduced by an appropriate amount. Although the image repository 141 is described above as a set of images separate from the set of images 144, image repository 141 and the set of images 144 may include the same set of images in some embodiments.

Referring again to method 300, at step 340, the metadata generating component 222 stores values determined at step 330 as tag metadata associated with the object tag. The metadata generating component 222 may encode the tag metadata in any feasible format. In the illustrated embodiment, the tag metadata is stored in the set of tag metadata 143 within the storage 230.

At step 350, the metadata generating component 222 determines whether the object tags associated with the image have been processed. If so, the method 300 ends. If any object tags have not been processed, the method 300 returns to step 320, where the metadata generating component 222 selects an object tag associated with the image that has not yet been processed.

Figure 4:
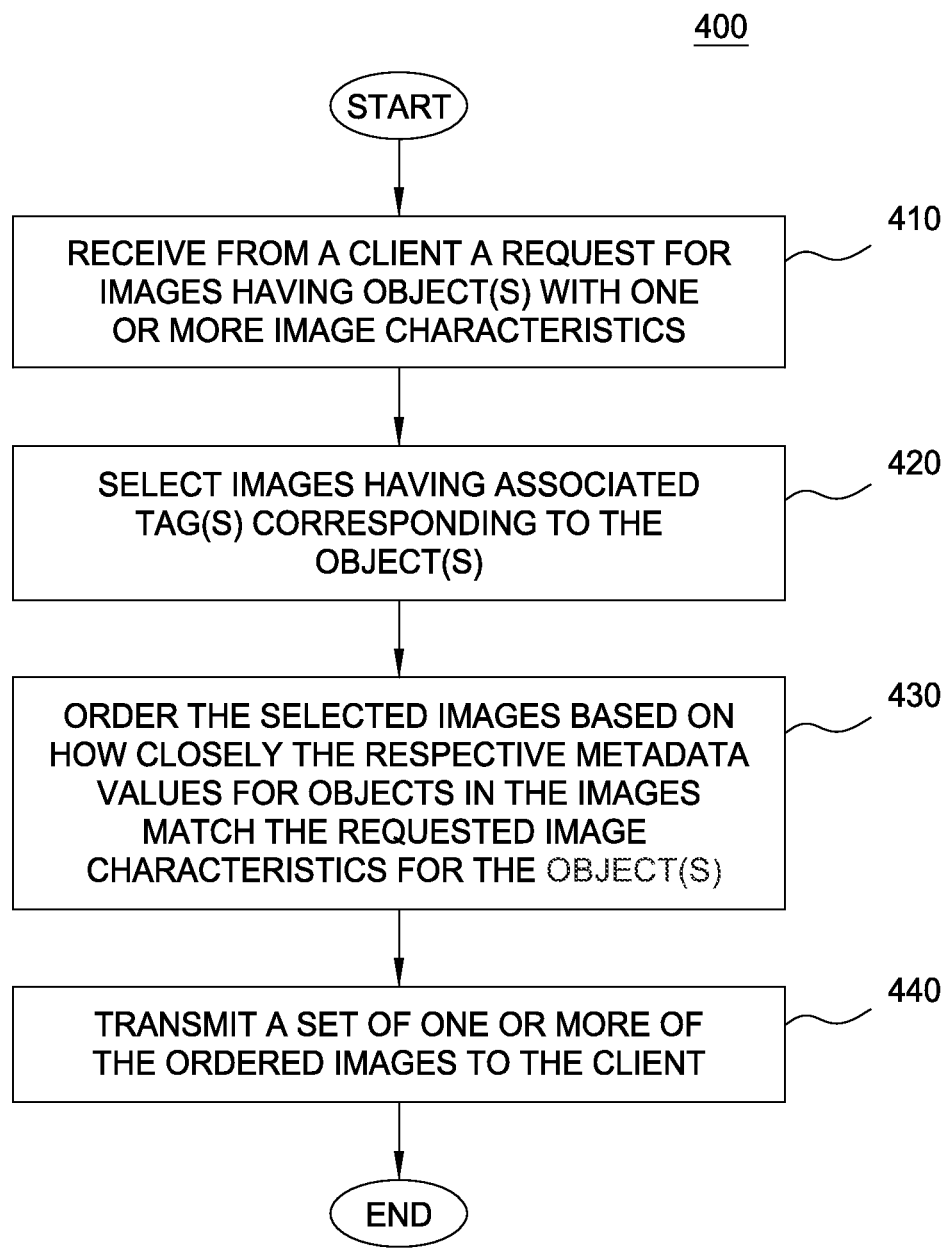
FIG. 4 illustrates a method for searching images using tag metadata associated with object tags, according to one embodiment of the invention.

FIG. 4 illustrates a method 400 for searching images using tag metadata associated with object tags, according to one embodiment of the invention. Although the method steps are described in conjunction with FIGS. 1-2, persons skilled in the art will understand that any system configured to perform the method steps, in any order, falls within the scope of the present invention.

As shown, the method 400 begins at step 410, where the server computer system 140 receives a request for images having an object or objects, and the object or objects have specified image characteristics. As noted, e.g., a user interacting with the computing system 120 or the mobile device 130 may compose an image search query by specifying keywords (image tag values) and the desired characteristics for one or more of the tag values (e.g., desired levels of focus, contrast, occlusion, prominence, etc.).

For example, the server computer system 140 may receive a request for images depicting the Eiffel Tower. The request may further specify that the Eiffel Tower object should have the image characteristic of being large in relative size to the picture itself (i.e., a high measure of prominence). In some embodiments, the parameters may be specified using binary values. For example, the user may only be able to request "in focus" or "out of focus". Alternatively, some of the parameters may be specified using a range of values. For example, the user may be able to request a specific measure of how well an object is in (or is out) of focus.

At step 420, the image retrieving component 225 selects images 144 that have the tag (or tags) specified in the image query. For example, where the server computer system 140 receives a request for images containing an Eiffel Tower object, the image retrieving component 225 may select the subset of the set of images 144 having an "Eiffel Tower" tag and related tags (e.g., "Eiffel," "Tower," etc.).

At step 430, the image ordering component 224 orders the images selected at step 420 based on how closely, or how well, the values of the metadata fields associated with tags for an object or objects in the images match the requested image characteristics. The image ordering component 224 may use any feasible approach to order the selected images. Further, as discussed above, each image characteristic specified in the image query may correspond to a metadata field associated with tags for the object. In some embodiments, image characteristics that do not correspond to any metadata fields associated with tags for the object or objects may be ignored or handled separately. For example, when the user specifies a query parameter that corresponds to a metadata field associated with image objects of some images but not others, the image ordering component 224 may assume an average metadata field value for the images whose image objects do not have the associated metadata field.

In one embodiment, how closely the values of the metadata fields match the requested image characteristics may be determined as a sum of Cartesian distances, each distance being associated with one object tag and calculated according to the formula:

$$D = \sqrt{\sum_n (P_n - M_n)^2},$$

where D is the distance, $P_n$ is the value of the nth requested property, and $M_n$ is the value of an nth metadata field value corresponding to the nth requested property. Such an embodiment may assume that $P_n$ and $M_n$ have one-to-one relationships. After determining the Cartesian distances for objects within each image selected at step 420, the image ordering component 224 may order the images based on the determined sum of Cartesian distances for each respective image.

In an alternative embodiment, how closely the values of the metadata fields match the requested image characteristics may be determined based on whether the requested properties exceed one or more threshold values. In such a case, the requested parameter values may be specified as binary values. For example, if an image query includes the keywords "Eiffel" and "Tower" and the parameters of "in focus" and "large," the image ordering component 224 may determine whether the size of the object, as indicated by a size metadata field, exceeds a threshold for being deemed "large" and whether the focus of the object (i.e., of the Eiffel Tower as depicted in the image), as indicated by a focus metadata field, exceeds a threshold for being deemed "in focus." Assuming an image meets the threshold for being deemed "large," a weight (e.g., +1) may be added to a total weight for the tag of the image. Similarly, if the image meets the threshold for being deemed "in focus," the total weight for the tag of the image may be incremented as well. After determining the total weights for each image selected at step 420, the image ordering component 224 may order the images based on the total weights for each image.

At step 440, the server computer system 140 transmits images ordered at step 430 (or thumbnail representations of such images along with links to full size images) to the client. For example, using the computing system 140 shown in FIG. 2, the application server 223 may generate web pages which present the search results (i.e., an indication of one or more images from the set of images and an ordering of those images) in the determined ordering to the web server 221. And in turn, the web server 221 may return the web pages to the client computing system 120 or the mobile device 130.

Although described above with respect to network-based searches, alternative embodiments may involve ordering a specified set of images locally or over a network. That is, a group of images may be ordered relative to some criteria. For example, a user may want to search or sort a set of images (e.g., a family photo album) within the client computing system 120 or the mobile device 130. In such a case, the set of images may be searched or sorted on client computing system 120 or mobile device 130 without communicating with server 140, and, in such a case, the image repository 141, the set of tags 142, the set of tag metadata 143, and the set of images 144 may be stored in storage of the client computing system 120 or the mobile device 130. Further, the metadata generating component 222 and the application server 223 including the image ordering component 224 and the image retrieval component 225 may be stored in memory of the client computing system 120 or the mobile device 130. For example, the images included in a folder on the client computing system 120 or mobile device 130 may be sorted. Further, a "mascot" image, which is the first image in the ordered set of images, may be displayed on, for example, a folder icon.

Figure 5:
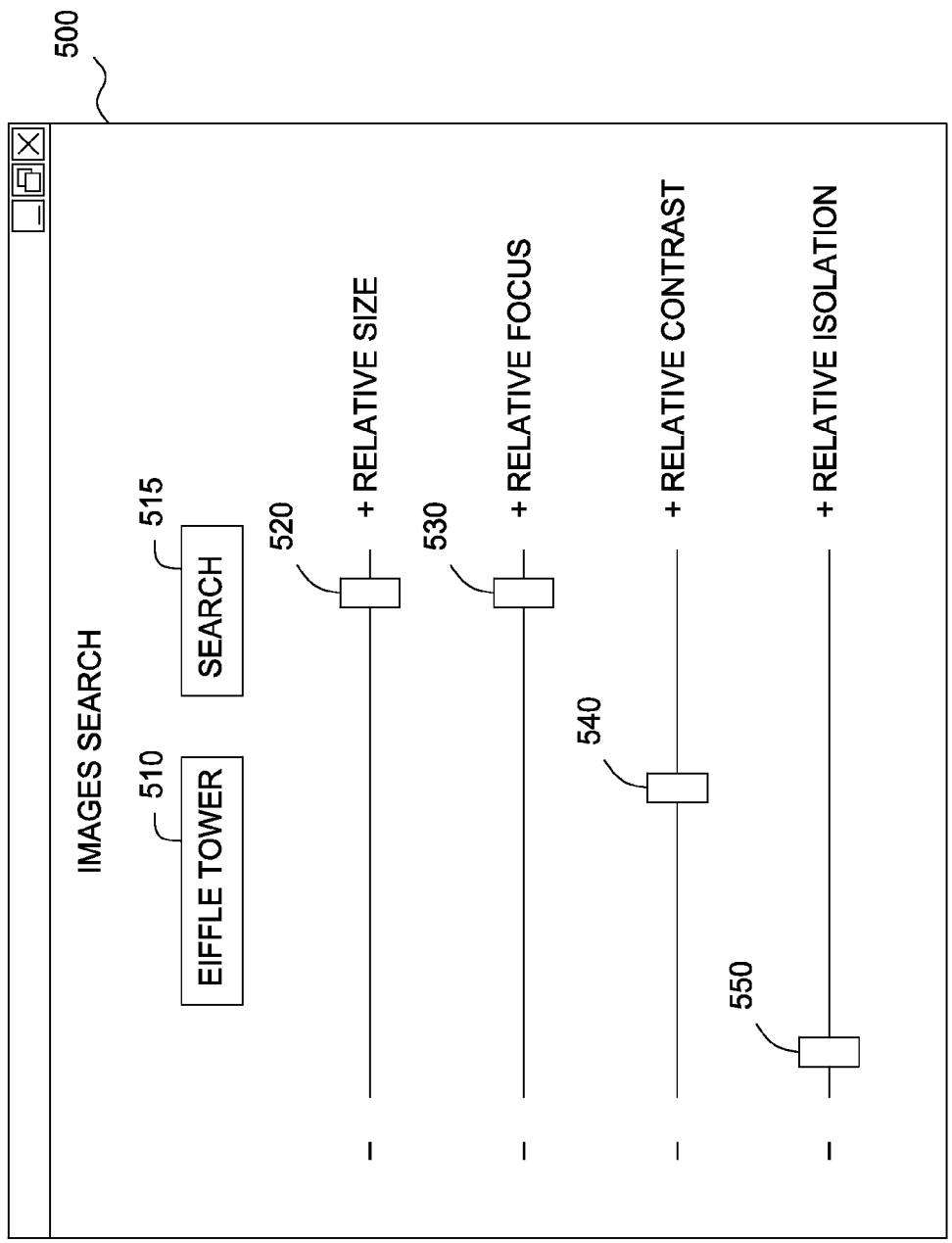
FIG. 5 illustrates a graphical user interface (GUI) for specifying parameters for searching and ordering a set of images, according to embodiments of the invention.

FIG. 5 illustrates a graphical user interface (GUI) 500 for specifying parameters for searching and ordering a set of images, according to embodiments of the invention. The GUI 500 itself includes a text field 510 for entering search text, which may be used to specify one or more object tags to be searched. In addition, the GUI 500 includes sliders 520, 530, 540, and 550 that allow a user to select image characteristic values. Specifically, slider 520 allows the user to select a relative size for the object or objects specified in the text field 510. As shown, slider 520 provides a range of relative size values from which a user may select. Likewise, sliders 530, 540, and 550 allow the user to select larger or smaller (or higher or lower) relative focus, relative contrast, and relative isolation values, respectively, for the object or objects specified in the text field 510. As shown, the user has entered "Eiffel Tower" in the text field 510, selected maximum relative size and relative focus using sliders 520 and 530, selected medium relative contrast using slider 540, and selected minimum relative isolation. These selections correspond to an image having an Eiffel Tower object that is large and in focus, but with medium contrast and blocked to a large extent by other objects. Finally, "Search" button 515 is selected to initiate a search using the parameters specified in the text field 510 and the sliders 520, 530, 540, and 550.

In some embodiments, the GUI 500 may be included in a web browser such as web browsers 125 and 135. In alternative embodiments, the GUI 500 may be useful for searching or sorting a set of images within the client computing system 120 or the mobile device 130 themselves.

Although described with respect to text field 510 and sliders 520, 530, 540, and 550, persons skilled in the art recognize that any input field or fields that allow users to specify parameters for a search may be used. Further, in some embodiments, multiple text fields and multiple sets of sliders or other input fields may be used to permit multiple objects, with associated object properties, to be specified.

Figure 6:
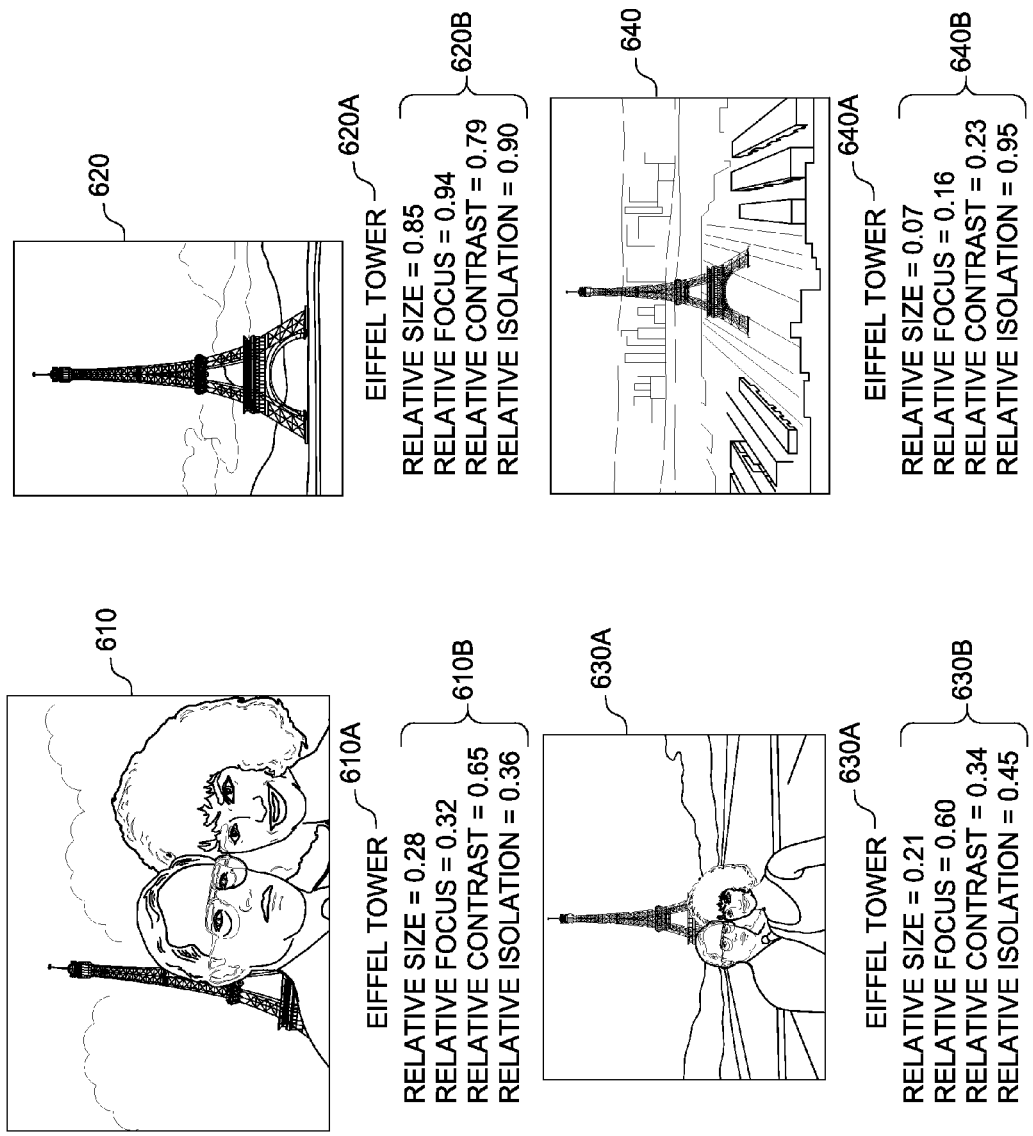
FIG. 6 illustrates an example of an unordered set of images with associated object tags and object tag metadata, according to one embodiment of the invention.

FIG. 6 illustrates an example unordered set of images with associated object tags and object tag metadata, according to one embodiment of the invention. As shown, images 610, 620, 630, and 640 have associated object tags 610a, 620a, 630a, and 640a. Each of the object tags 610a, 620a, 630a, and 640a is identified by "Eiffel Tower." Further, each of the object tags 610a, 620a, 630a, and 640a is associated with a respective set of tag metadata 610b, 620b, 630b, and 640b. As shown, the tag metadata 610b, 620b, 630b, and 640b includes fields for relative size, relative focus, relative contrast, and relative isolation of the objects associated with the respective object tags 610a, 620a, 630a, and 640a. As shown, the value of the tag metadata 610b, 620b, 630b, and 640b range from a minimum of 0 to a maximum of 1, and the values are not values relative to the images of an image repository such as image repository 141. For example, a focus of 1 would indicate that the object is maximally focused relative to other objects in the image, and vice versa.

Figure 7:
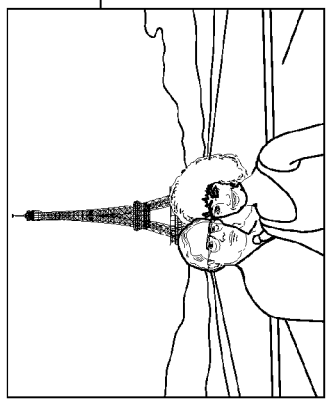
FIG. 7 illustrates the set of images of FIG. 6, after the images are ordered based on the value of the parameters shown in FIG. 5.
Figure 7:
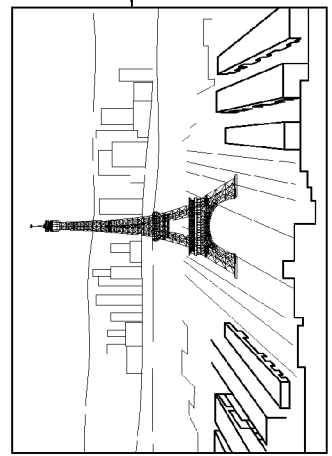
Figure 7:
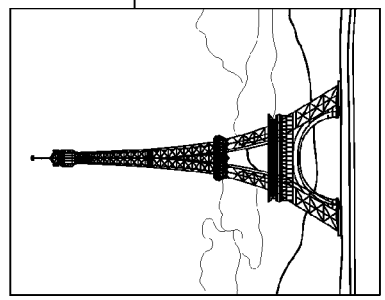
Figure 7:

FIG. 7 illustrates the set of images of FIG. 6 after the images are ordered based on the value of the parameters shown in FIG. 5, according to one embodiment of the invention. As shown, the ordering is based on the Cartesian distance technique discussed herein. In particular, image 620 is ordered first, followed by image 630, image 610, and image 640, respectively because the Cartesian distances D for these images are 0.96, 1.00, 1.06, and 1.60, respectively.

Advantageously, object tag metadata helps characterize the actual appearance of tagged objects within their respective images. Using tag metadata, searches can be performed for images having objects with specific parameter values (e.g., relative size, focus, isolation, contrast, etc.), thereby allowing the searches to order the images so as to present the most relevant images first to the user.

While the foregoing is directed to embodiments of the present invention, other and further embodiments of the invention may be devised without departing from the basic scope thereof, and the scope thereof is determined by the claims that follow.

What is claimed is:

1. A computer-implemented method responding to an image search request, the method comprising:
    receiving a request which includes one or more keywords and one or more parameters specifying desired image characteristics;
    identifying, via one or more processors, a set of images responsive to the request based on a match of the keywords to image tags, wherein each image tag is associated with one of a plurality of objects which is depicted in one of the images from the set of images;
    determining an ordering of the identified set of images by comparing the received parameters with corresponding tag metadata fields, each tag metadata field being distinct from and associated with one of the image tags; and
    returning an indication of the set of images and the determined ordering of the images,
    wherein each tag metadata field has a numerical value, the numerical value being determined as a relative value of a given image characteristic of one of the objects as depicted in one of the images when compared to the given image characteristic of the one of the objects as depicted in a plurality of images of an image repository, and
    wherein determining the ordering of the identified set of images comprises:
        comparing the received parameters with the corresponding tag metadata fields to determine whether predefined threshold values are met;
        for each of the predefined threshold values that is met, increasing a weight value for the image tag to which the corresponding tag metadata field is associated; and
        ordering the set of images based on at least the weight values for the image tags associated with the images in the set of images.

2. The computer-implemented method of claim 1, wherein a first one of the tag metadata fields represents a relative size of one of the objects.

3. The computer-implemented method of claim 1, wherein a first one of the tag metadata fields represents a relative focus of one of the objects.

4. The computer-implemented method of claim 1, wherein a first one of the tag metadata fields represents a relative contrast of one of the objects.

5. The computer-implemented method of claim 1, wherein a first one of the tag metadata fields represents a relative isolation of one of the objects.

6. The method of claim 1, wherein the set of images includes at least one dynamic image or a video sequence itself comprising a plurality of images.

7. A computer-implemented method for ordering a set of images, the method comprising:

determining, via one or more processors, an order for the set of images based at least on a comparison of values of one or more object image characteristic parameters with values of one or more tag metadata fields, wherein each tag metadata field is distinct from and associated with one of a plurality of image tags, each image tag being associated with an object depicted in one of the images from the set of images; and in response to a request to view the set of images, presenting one or more images of the set of images in the determined order, wherein each tag metadata field has a numerical value, the numerical value being determined as a relative value of a given image characteristic of one of the objects as depicted in one of the images when compared to the given image characteristic of the one of the objects as depicted in a plurality of images of an image repository, and wherein determining the ordering of the identified set of images comprises:

comparing the received parameters with the corresponding tag metadata fields to determine whether predefined threshold values are met;

for each of the predefined threshold values that is met, increasing a weight value for the image tag to which the corresponding tag metadata field is associated; and ordering the set of images based on at least the weight values for the image tags associated with the images in the set of images.

8. The computer-implemented method of claim 7, wherein the set of images is stored locally.

* * * * *